V. C. FULLER.
CANDY DEPOSITING MACHINE.
APPLICATION FILED SEPT. 1, 1910.
989,700.
Patented Apr. 18, 1911.
3 SHEETS—SHEET 1.
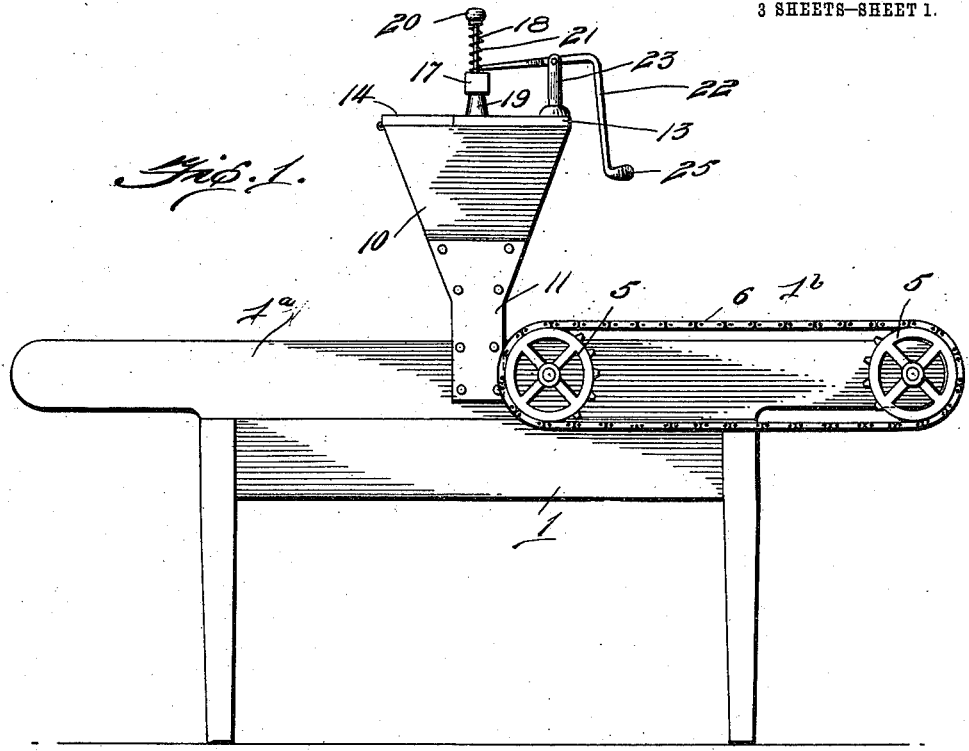
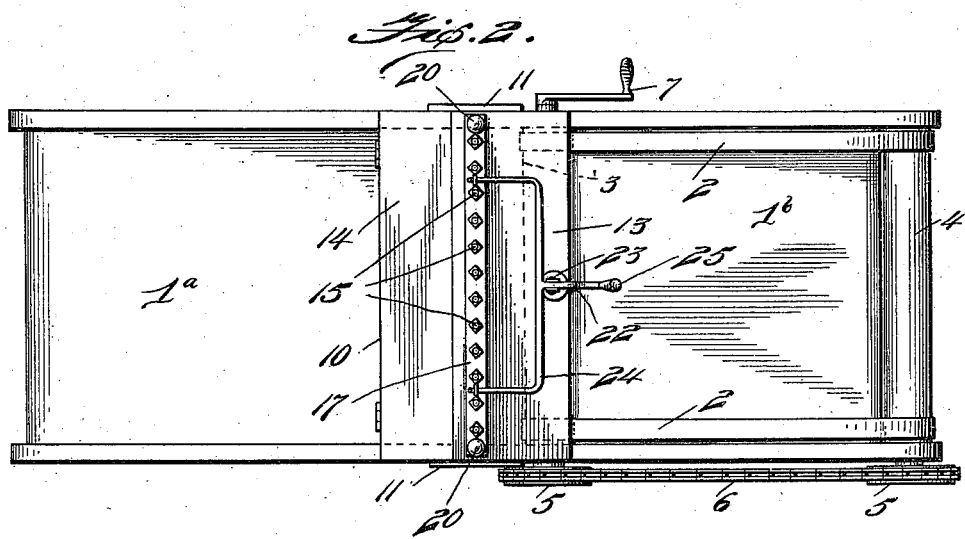

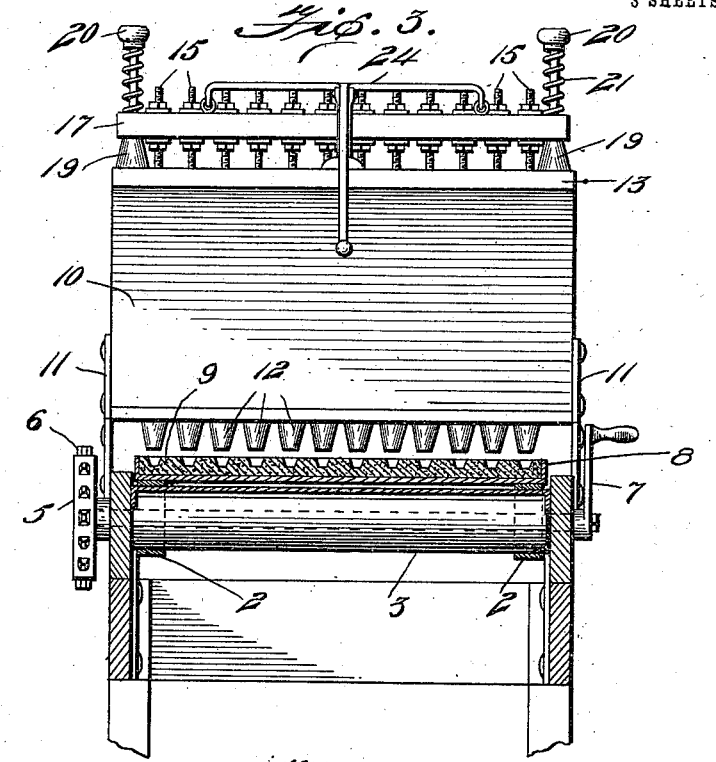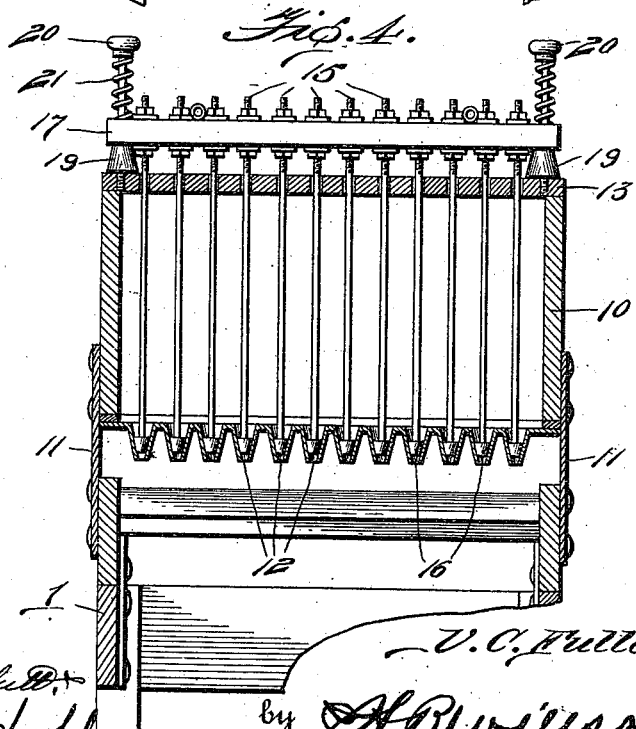

V. C. FULLER.
CANDY DEPOSITING MACHINE.
APPLICATION FILED SEPT. 1, 1910.

989,700.

Patented Apr. 18, 1911.
3 SHEETS—SHEET 3.

Witnesses
Inventor
V. C. Fuller
by
Attorneys

UNITED STATES PATENT OFFICE.

VITELLES C. FULLER, OF FRANKFORT, INDIANA.

CANDY-DEPOSITING MACHINE.

989,700.  Specification of Letters Patent.  Patented Apr. 18, 1911.

Application filed September 1, 1910. Serial No. 580,023.

*To all whom it may concern:*

Be it known that I, VITELLES C. FULLER, a citizen of the United States, residing at Frankfort, in the county of Clinton and State of Indiana, have invented certain new and useful Improvements in Candy-Depositing Machines; and I do declare the following to be a full, clear, and exact description of the invention, such as will enable others skilled in the art to which it appertains to make and use the same.

This invention relates to improvements in candy depositing machines.

The invention consists in the construction and arrangement of parts, as will be hereinafter described and particularly pointed out in the claim.

Figure 5:
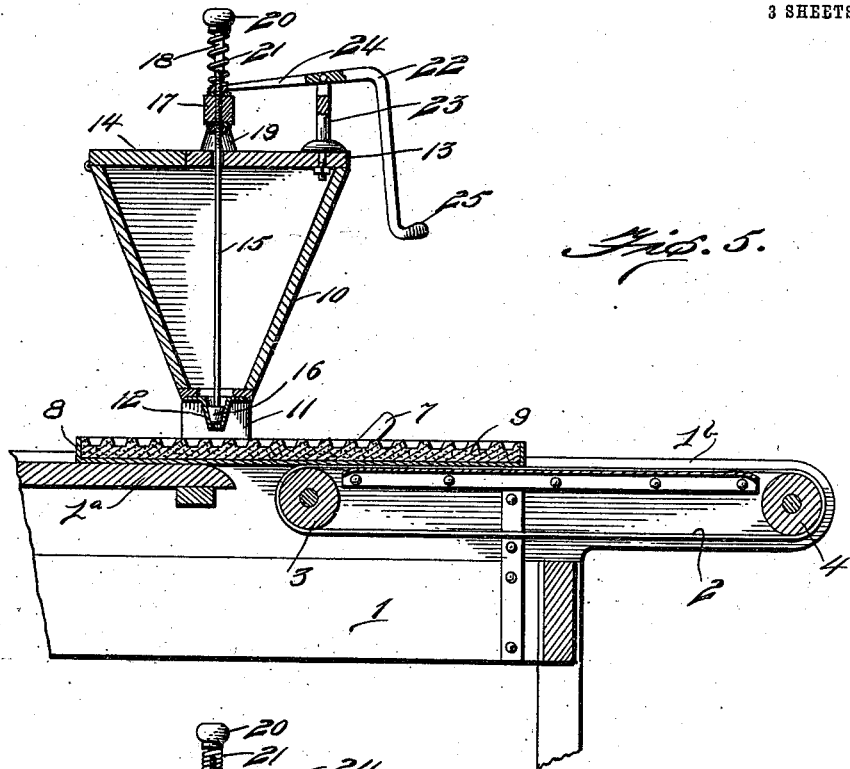
Figure 6:
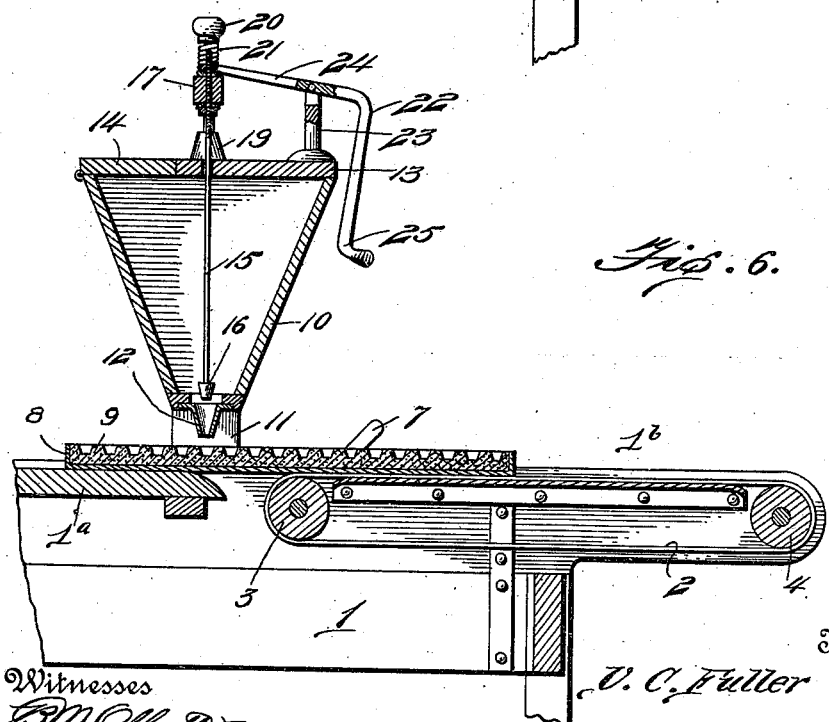

In the accompanying drawings: Figure 1 is a side view of a candy depositing machine constructed in accordance with the invention; Fig. 2 is a plain view thereof; Fig. 3 is a vertical transverse section; Fig. 4 is a transverse section taken centrally through the hopper; Fig. 5 is a vertical longitudinal section showing the plungers in closed position; and, Fig. 6 is a similar view showing the plungers in open position.

Referring more particularly to the drawing, 1 denotes a supporting bench or table having stationary and movable top portions 1$^a$ and 1$^b$ respectively, both of which being arranged in the same general plane with each other and the latter comprising an endless conveyer mechanism comprising pairs of belts 2 which pass over rollers 3 and 4 suitably mounted on the bench or table. On one end of the rollers 3 and 4 are fixedly mounted sprocket gears 5, which are connected together by a sprocket chain 6 whereby the movement of one of said rollers is conveyed to the other for the purpose of properly moving the conveyer belts 2. On the opposite end of the roller 3 from the sprocket gear 5 is fixed a crank handle 7 whereby said rollers are operated. Connected to and adapted to be operated by the conveyer belts 2 is a mold tray 8 which contains the molds 9 to receive the liquid candy, said molds being formed of cornstarch or other similar material.

Arranged across the bench or table 1 and supported a suitable distance above the molds thereon and immediately above the inner end of the stationary portion of the table is a candy hopper 10 formed of any suitable material and having its opposite sides inclined downwardly and inwardly from its upper toward its lower end as shown. The ends of the hopper have secured thereto downwardly projecting supporting plates 11 which engage and are secured to the opposite sides of the table 1 in any suitable manner.

In the bottom of the hopper are formed a series of discharge openings each of which is provided with a discharge funnel 12, said discharge openings and funnels being arranged in a straight line across the bottom of the hopper as shown. The top of the hopper is provided with a top or cover comprising a stationary section 13 which is firmly secured to the top of the hopper and a movable section 14 which is hingedly connected to the upper edge of one side of the hopper and is adapted to be opened and closed to permit the filling of the hopper.

In the stationary portion 13 of the cover is slidably mounted a series of plunger rods 15, said rods being disposed in line with the centers of the discharge passages and funnels 12 of the hopper. On the lower end of each of the rods 15 is secured a tapered plunger 16, said plunger being engaged with the funnels when projected outwardly by the rod 15. The upper ends of the rods 15 are engaged with and secured to an operating bar 17 arranged above the hopper and having its opposite ends slidably engaged with guide rods 18 arranged in the stationary portion 13 of the top. The rods 18 may be secured in any suitable manner to the top of the hopper but are here shown and are preferably secured in sockets 19 arranged on the top of the hopper and which form stops or recesses for the plunger operating bar 17 whereby the downward movement of the plunger rods and plungers is limited. The guide rods 18 are provided on their upper ends with heads 20 between which and the operating bars 17 are arranged coiled springs 21 the pressure of which is exerted to force the bar 17 downwardly and the plungers into engagement with the funnels whereby the latter are closed and the flow of liquid therethrough stopped.

In order to lift the plunger rods and plungers whereby the latter will be disengaged from the funnels to permit the discharge of candy from the hopper, I provide a plunger retracting lever which is pivotally mounted in a suitable supporting standard 23 arranged on the stationary portion 13 of the top of the hopper. The lever 22 is connected to the operating bar 17 of the plunger by a bail shaped frame 24 and at its outer end said lever projects downwardly and has formed on its lower end a suitable handle 25 which is located at the front of the hopper and which when engaged and pressed downwardly by the operator will rock the lever 22, thereby lifting the plunger operating bar 17 and the plungers 16 out of engagement with the funnels 12 thereby permitting the candy to flow through said funnels and into the molds which have been brought beneath the same by the operation of the conveying mechanism hereinbefore described. As soon as the molds are filled, the lever 22 is released and the springs 21 permitted to force the operating bar 17 downwardly thereby again bringing the plungers into engagement with the funnels, thus cutting off further discharge of the candy.

The machine herein described is designed to be manually operated and in view thereof, the handle 7 is located at one side of the machine and at the right of the lever 22, the former being adapted to be engaged by the right hand of the operator and the latter by the left hand so that both can be conveniently manipulated at the will of the operator and at the same time. The lever 22 by being disposed above the inner end of the movable portion of the table and immediately at the front of the hopper enables the operator to readily view the discharge ends of the funnels and to accurately gage the discharge of the candy on movement of the mold beneath the hopper. It will be seen that by the time the last end of the mold has passed beneath the hopper the mold will be substantially wholly supported by the stationary portion of the table, hence my object in arranging the stationary and movable portions respectively of the table in the same general plane with each other.

Having thus described my invention, what I claim is:

A candy dropping apparatus comprising a support with a hopper thereon having downwardly extending plates secured to the support for holding the hopper above the support said hopper having a row of longitudinal openings in the bottom, a series of integral discharge funnels secured to the bottom of the hopper and registering with the openings therein, a stationary and a movable cover for the hopper, the stationary cover being provided with a series of plunger rods having tapering plungers thereon which are arranged in line with said openings and said funnels, an operating bar arranged above said hopper having the upper ends of the plunger rods secured thereto so as to be slidably mounted in the stationary cover, sockets on the stationary cover, guide rods having their lower ends secured to said sockets, the opposite ends of the operating bar being slidably mounted on said guide rods, said guide rods having coiled springs thereon, a horizontal bail connected to the operating bar, a pivoted lever connected to the bail so as to retract the plunger rods and plungers from said funnels, and said sockets providing stops for the operating bar so as to limit the downward movement of the plunger rods and their plungers.

In testimony whereof I have hereunto set my hand in presence of two subscribing witnesses.

VITELLES C. FULLER.

Witnesses:
JOHN C. SHANKLIN,
CHARLES S. ASHMAN.

---

Copies of this patent may be obtained for five cents each, by addressing the "Commissioner of Patents, Washington, D. C."